May 27, 1924.
H. C. STARKE
1,495,451
GRINDER HEAD FOR ASSEMBLED PISTONS
Filed Nov. 4, 1922       2 Sheets-Sheet 1
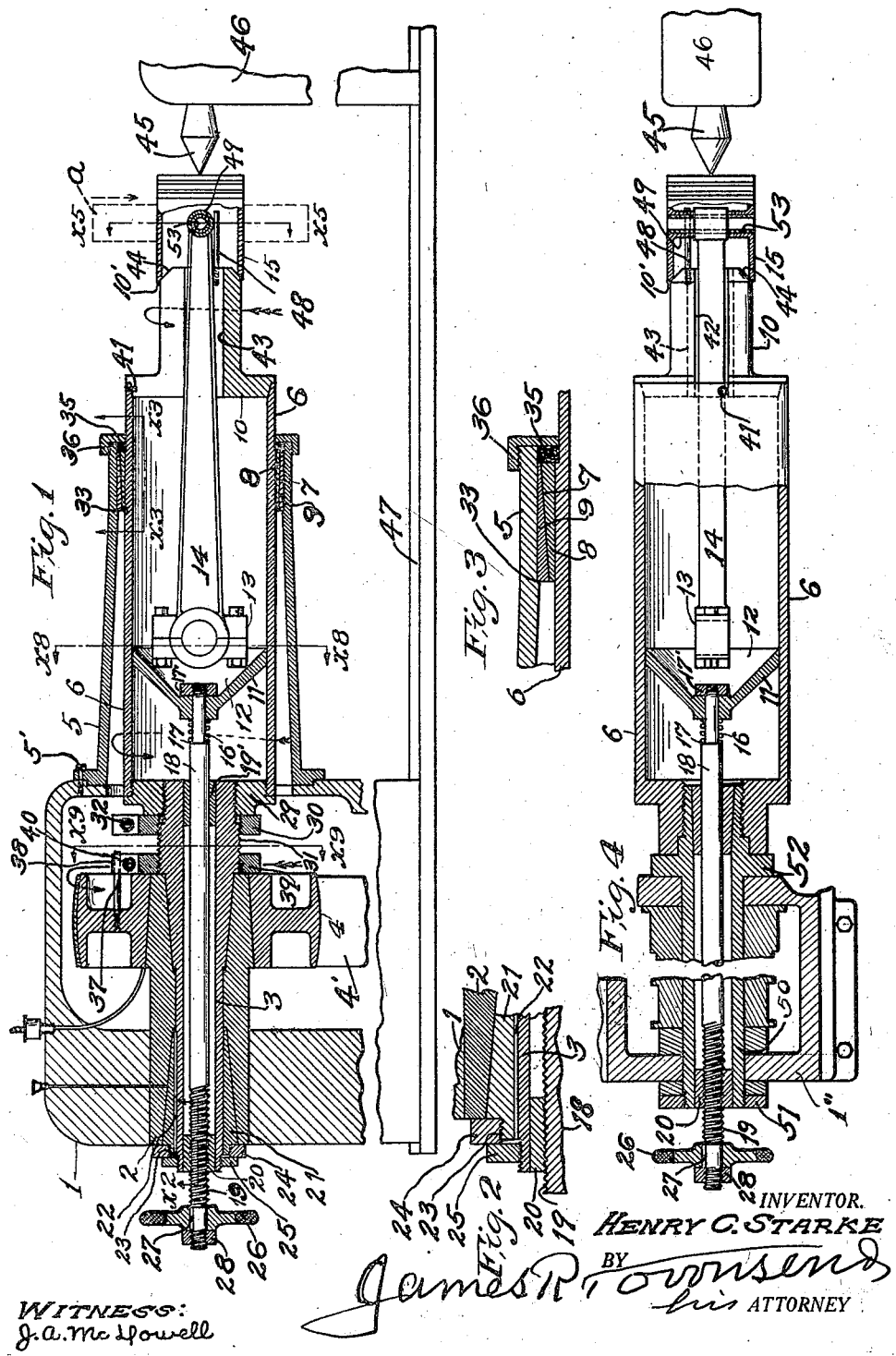

May 27, 1924.
H. C. STARKE
GRINDER HEAD FOR ASSEMBLED PISTONS
Filed Nov. 4, 1922
1,495,451
2 Sheets-Sheet 2
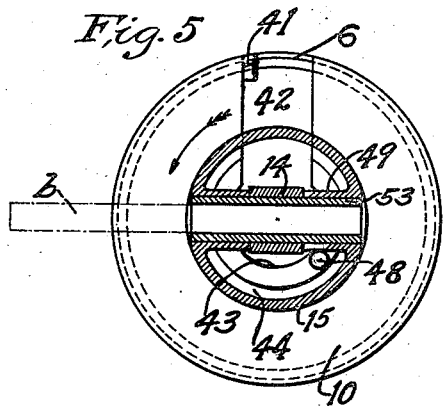
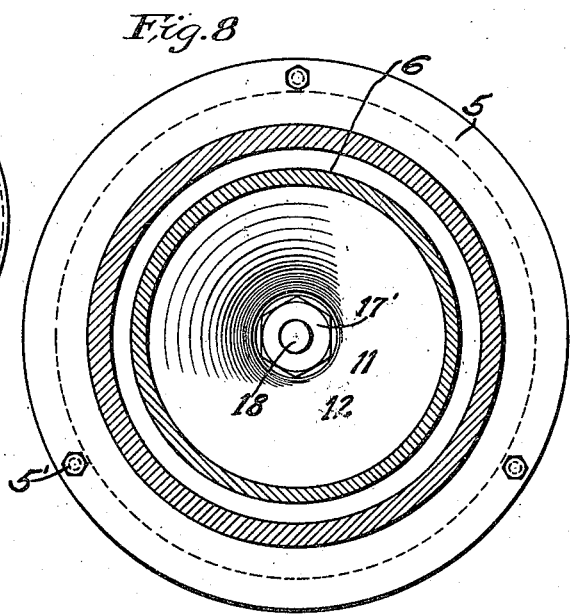
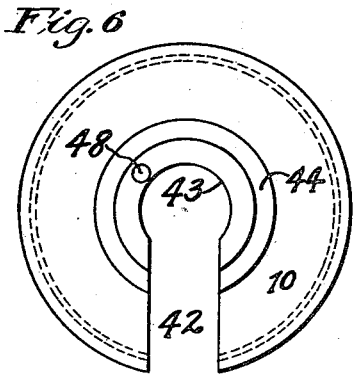
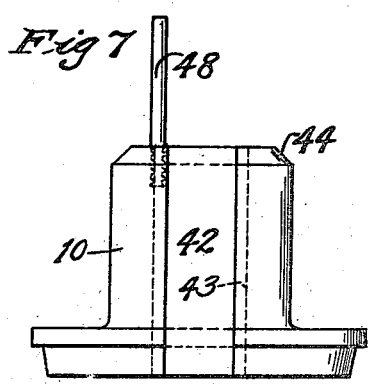
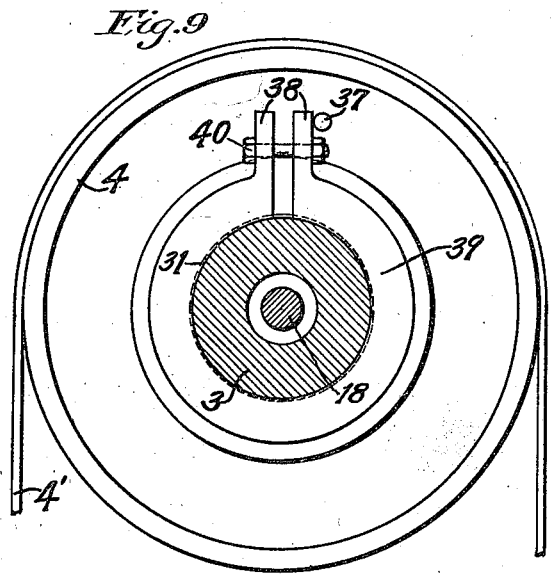
INVENTOR.
HENRY C. STARKE
BY Townsend
ATTORNEY
WITNESS:
J. A. McDowell Patented May 27, 1924.

1,495,451

UNITED STATES PATENT OFFICE.

HENRY C. STARKE, OF LOS ANGELES, CALIFORNIA.

GRINDER HEAD FOR ASSEMBLED PISTONS.

Application filed November 4, 1922. Serial No. 599,120.

*To all whom it may concern:*

Be it known that I, HENRY C. STARKE, a citizen of the United States, residing at Los Angeles, in the county of Los Angeles and State of California, have invented a new and useful Grinder Head for Assembled Pistons, of which the following is a specification.

An object of this invention is to provide means whereby a piston connected to a connecting rod may be perfectly ground so that when it is assembled with the cylinder and crank shaft of an engine, it will be perfectly true.

The invention is broadly new, basic and pioneer in that I provide in a grinder head for assembled pistons, three alined bearings to support the alined piston head and connecting rod; one of said bearings being an external lathe center to engage and support the closed end of the piston head; another being an internal centering support for the piston head; and the third being an external centering support for the crank shaft bearing of the connecting rod; and I provide means for adjusting the external piston head center and the external centering support for the crank shaft bearing of the connecting rod so that the piston and connecting rod are clamped between the lathe center and the crank shaft bearing centering means; and the piston head is clamped between the lathe center and the internal piston head centering support.

Preferably the support for the crank shaft bearing of the connecting rod has a conical concave head the inside walls of which engage the ends of said crank shaft bearing; and the internal support for the open end of the piston head is conical so as to center the piston head; the concave and conical supports being co-axial with the lathe center and the axis of rotation of the three centers.

A further object of the invention is ease and accuracy of adjusting the assembled piston head and connecting rod in the grinding head.

Another object is to exclude dust and dirt from the revolving bearings of the grinder head.

A further object is to make provision for grinding the wrist pin clearance of the piston head by hand after the main grinding has been completed.

The invention is applicable for use with some forms of grinder heads as for instance with the form of grinder head known as the Landis grinder and is also applicable for use in a lathe.

A feature of the invention includes the means whereby the newly invented grinder is made attachable to the Landis grinder head housing and in this respect an object of the invention is to make provision whereby when the invention is used in connection with the Landis grinder head housing the piston assembled with the connecting rod and connecting rod bearing can be oscillated without interference of the driving pulley and its belt; so that when it is desired, the piston head may be ground to give clearance for the wrist pin.

Other objects, advantages and features of invention may appear from the accompanying drawings, the subjoined detail description and the appended claims.

The accompanying drawings illustrate the invention.

Figure 1 is a fragmental longitudinal sectional elevation of my invention applied to a Landis grinder head housing, and showing a connecting rod, wrist pin, and the fragment of a piston, in position for grinding the piston. Dotted lines, diagrammatically indicate an emery wheel.

Fig. 2 is an enlarged fragment of said section at the part set off by line $x^2$, Fig. 1.

Fig. 3 is an enlarged fragment of said section set off by line $x^3$, Fig. 1.

Fig. 4 is a plan view partly in section showing such parts of this invention together with a connecting rod and its bearing and a wrist pin and the fragment of a piston, in position for turning the piston in a lathe prior to grinding.

Fig. 5 is an enlarged elevation showing the piston head and wrist pin in section on line $x^5$, Fig. 1 with centering support and with the driving pins in position for revolving the piston. There is also shown a rod that can be used for turning the piston when grinding for wrist pin clearance. Dot and dash lines indicate manual means for rocking the piston head to grind wrist pin clearance.

Fig. 6 is an end view of the centering piston head support turned half way round from the position shown in Fig. 5, omitting the piston head.

Fig. 7 is a detail of the piston head centering support and the piston head driving pin.

Fig. 8 is an enlarged view partly in cross section on line $x^8$, Fig. 1, showing bolts, and the connecting rod crank shaft bearing centering support in position and omitting the connecting rod.

Fig. 9 is an enlarged view partly in cross section on line $x^9$, Fig. 1 showing the pulley and the driving pin in position against the clamp collar for driving the assembled piston support when used on grinders.

The frame 1 shown in Fig. 1, or 1'' shown in Fig. 4, may be the frame of a Landis grinder head, or of any usual grinder head provided with a seat or extension 2 in which the hollow arbor 3 is journalled, and upon which is mounted the pulley 4 which is revolved by the belt 4' connected to any suitable source of power.

The frame 1 is provided with a grinder head comprising a stationary bearing 5 in the form of a housing which is secured to said frame by means of the bolts 5'. A revolving bearing and guide 6 is journalled at 7 to the stationary bearing 5, and made close fitting by annular tapered bronze bushings 8 and 9.

The revolving bearing and guide 6 is provided at its outer end with a removable internal piston head center 10 for the open end 10' of a piston head 15. A revolving connecting rod internal centering support or bearing 11 is slidably mounted in said revolving bearing and has a conical cavity 12 that forms the centering means and bearing for the crank shaft bearing 13 of the connecting rod 14 when the piston 15 contacts with the removable piston center 10. Said connecting rod center 11 is rotatably mounted on the adjusting rod 18 and is yieldingly held toward the internal piston head center 10 by means of a spring 16 that operates between the shoulder 17 on the adjusting rod 18 and the connecting rod center 11. A nut 17' screwed on the inner end of said rod 18 serves as a stop to retain the connecting rod center 11 on the adjusting rod 18, and which rod extends axially through the hollow arbor 3, and is adjustable by means of a thread 19 engaging a nut 20 held by a drive fit in the hollow arbor 3.

The bushing 19' held by a drive fit in the inner end of the hollow arbor 3 serves as a bearing for the rod 18 and maintains said rod in axial alinement.

The hollow arbor 3 is secured in the seat 2 by the taper bearing 21 which is secured to the arbor 3 by means of the key 22. The outer end of the taper bearing 21 is threaded as at 23 to receive the adjusting nut 24 that is adapted to be adjusted on the taper bearing 21 and to contact with the frame 1 to position the taper bearing 21 in its seat; such adjustment is adapted to take up wear of the taper bearing and arbor. A lock nut 25 threaded on the arbor 3 locks the adjusting nut in adjusted position and retains the arbor and taper bearing in adjusted position.

A hand wheel 26 is secured to the adjusting rod 18 by the key 27 and the nut 28 retains the key in position.

The revolving bearing support and grinder 6 is secured to the end plate 29 that is adjustably mounted on the arbor 3. A lock nut 30 in the form of a split collar is threaded on the left hand threaded portion 31 of the arbor 3 and is clamped thereon by means of the bolt 32. This construction affords means to take up wear on the annular tapered bronze bushings 8, 9. The bushings 8, 9 have a drive or press fit with the guide 6 and stationary support 5 respectively and the inner end of the bushing 9 engages the shoulder 33 in the stationary bearing 5, that form a stop for the bushing 9 so that as the bearing is adjusted on the arbor 3 the bushing 8 will be adjusted accordingly. The packing 35 is interposed between the bushings 8, 9 and the cover 36 that is screw threaded onto the stationary bearing 5, to prevent grindings and water from entering the frame 1.

The stationary bearing 6 and associated parts are driven in the direction of the arrow, Fig. 1, by the pin 37 which is secured to the pulley 4 and engages the extensions 38 of the collar 39 that is locked in engagement with the threaded portion 31 of the arbor 3 by the bolt 40. The outer end of said support 6 is provided with an inwardly extending pin 41 which engages one side of a slot 42 that extends from the central orifice 43 in the removable center 10, to the periphery of said center 10.

Said center 10 is provided at its outer end with a tapered surface 44 which is adapted to engage the open edge of the piston head 15 and alines the piston co-axially with the connecting rod center 11 and the external lathe center 45 that is adapted to pivotally engage the closed end of the piston head and that is adjustably mounted in the usual support 46 which is adjustable longitudinally on the bed 47 of the frame 1 as is well known in the art.

The tapered surface 44 of the removable center 10 may be made in various standard diameters to accommodate various sized pistons. A driving arm 48 is secured in the outer end of the removable center 10 and is adapted to engage the wrist pin bearing 49 and rotate the piston head when said center 10 is rotated by the pin 41.

In Fig. 4 I have shown the device adapted for mounting on a lathe. A hollow lathe spindle 50 is provided in place of the hollow arbor 3 and is adapted to be inserted in the spindle head of any standard lathe. The nut 51 draws the shoulder 52 against the spindle head, and securely locks the spindle therein, thus permitting a roughing cut to be taken on the lathe before finishing the piston head on the grinder.

In practical operation the piston head 15 with the connecting rod 14 assembled therein by means of the wrist pin 53 seated in the wrist pin bearing 49 may be ground by removing the internal center 10 from the stationary bearing 6 and inserting the connecting rod 14 through the slot 42 and then mounting the center 10 in the stationary bearing 6. The lathe center 45 is adjusted to engage the closed end of the piston head 15 so that such piston head is clamped or centered between the lathe center 45 and the internal piston head support 10. The connecting rod center 11 is then adjusted to engage the crank shaft bearing and the conical concave head of said connecting rod center will aline the connecting rod 14 co-axially with the connecting rod center 11, the internal centering support for the piston head, and the external lathe center which engages the closed end of the piston head.

The pulley 4 is rotated by means of the belt 4' connected with any suitable source of power and the pin 37 engages the extensions 38, of the collar 39 and rotates the hollow arbor 3 and the bearing support 6, the inwardly extending pin 41 engages one side of the slot 42 and rotates the removable center 10 until the driving arm 48 engages the wrist pin bearing 49 to rotate the piston head co-axially with the lathe center 45. The emery wheel $a$ shown in dotted lines Fig. 1 is rotated in the direction of the dotted arrow by any suitable mechanism not shown, and is adapted to grind the piston head 15.

When it is desired to grind the wrist pin clearance on the piston head, a stick or rod $b$, Fig. 5, inserted in the wrist pin 53 may be used to oscillate the piston head in a manner well known in the art. The extensions 38 of the collar 39 will not engage the pin 37 during such oscillation and it is thus seen that guide 6, piston head bearing 10, and the piston head 15 may be turned in a reverse direction practically a full revolution.

I claim.

1. A grinder head for assembled pistons comprising three alined bearings to support the alined piston head and connecting rod, one of said bearings being an external lathe center to engage and support the closed end of the piston head; another being an internal centering support for the piston head, and the third being an external centering support for the crank shaft bearing of the connecting rod; and means for revolving said internal centering support to rotate the piston head.

2. In a device of the character set forth, a revolving external bearing for a connecting rod bearing; a revolving bearing and guides for said external bearing; means for yieldingly adjusting said external bearing along said guide; a piston head bearing on the end of said guide; and means on said guide to engage the piston head bearing to cause the same to rotate with the guide.

3. In a device of the character set forth, a stationary support; a guide journalled in said support; means in said guide to yieldingly support and center a connecting rod bearing; means on one end of said guide to engage and center the open end of a piston head and adapted to be rotated by said guide; means to engage and center the closed end of said piston head; and means engaging said piston head to rotate said piston head simultaneously with the guide.

4. A grinder head for assembled pistons comprising in combination with a frame having an extension thereon; and a lathe center; an arbor journalled in said extension; a stationary support secured to said frame; a guide journalled in said support and connected to said arbor; a bearing for a connecting rod bearing adjustably mounted in said guide; a piston head centering bearing on said guide and adapted to clamp a piston head between its end and said lathe center; a pulley mounted on said extension; means contacting with said pulley for rotating said arbor; and means connected to said piston head bearing to rotate said piston for the purpose set forth.

5. A grinder head for assembled pistons comprising in combination with a frame and a lathe center; a stationary support secured to said frame; a guide journalled in said support; a bearing for a connecting rod bearing adjustably mounted in said guide; a piston head bearing removably mounted on the end of said guide and adapted to clamp a piston head between its end and said lathe center; and means to rotate said guide and piston head bearing.

6. A grinder head for assembled pistons comprising in combination with a frame and a lathe center; a stationary support secured to said frame; a guide journalled in said support; a bearing for a connecting rod bearing adjustably mounted in said guide; a piston head bearing removably mounted on the end of said guide and adapted to clamp a piston head between its end and said lathe center; means to rotate said guide and piston head bearing; and means secured to said piston head bearing to engage and rotate the piston head.

7. A grinder head for assembled pistons comprising in combination with a frame and a lathe center, a hollow arbor journalled in said frame; a stationary support secured to said frame; a guide journalled in said support and secured to said hollow arbor; means mounted in said guide and adapted to center a connecting rod bearing; means connected to said centering means and extending through said hollow arbor and adapted to adjust said centering means longitudinally in said guide; means for rotating said arbor and said guide; and means removably mounted in said guide adapted to receive a connecting rod assembled to a piston head and to hold said piston head in engagement with the lathe center and in co-axial alinement with said lathe center.

8. A grinder head for pistons having connecting rods assembled thereto comprising in combination with a frame and a lathe center, an arbor journalled in said frame; a stationary support secured to said frame; a guide adjustably secured to said arbor and journalled in said support, the bearing for said journal comprising tapered bushings; centering means for a connecting rod bearing; means for adjusting said centering means in said guide; means for adjusting said guide on said arbor to take up wear in said tapered bushings; a piston head centering support removably mounted in the outer end of said guide and provided with a slot and a central orifice adapted to receive the connecting rod, said piston head support having a tapered surface adapted to engage and center a piston head between said surface and said lathe center; a driving arm secured to said piston head support and adapted to engage the wrist pin bearing of a piston head to rotate said piston head; means secured to said guide and adapted to engage said piston head support to rotate the same; and means for rotating said arbor.

In testimony whereof, I have hereunto set my hand at Los Angeles, California, this 30th day of October, 1922.

HENRY C. STARKE.

Witness:
JAMES R. TOWNSEND.